(12) United States Patent
Czekay et al.

(10) Patent No.: US 7,057,375 B2
(45) Date of Patent: Jun. 6, 2006

(54) POWER FACTOR CORRECTION

(75) Inventors: Dietmar Czekay, Dresden (DE); Martin Honsberg-Riedl, Teisendorf (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/508,133

(22) PCT Filed: Mar. 5, 2003

(86) PCT No.: PCT/DE03/00721

§ 371 (c)(1),
(2), (4) Date: Sep. 17, 2004

(87) PCT Pub. No.: WO03/081756

PCT Pub. Date: Oct. 2, 2003

(65) Prior Publication Data

US 2005/0104564 A1    May 19, 2005

(30) Foreign Application Priority Data

Mar. 21, 2002  (DE) ................. 102 12 645

(51) Int. Cl.
*G05F 1/70*  (2006.01)
(52) U.S. Cl. .......................... 323/207; 363/47
(58) Field of Classification Search ............... 323/207, 323/365, 205, 364, 288; 363/47
See application file for complete search history.

(56) References Cited

U.S. PATENT DOCUMENTS

| | | |
|---|---|---|
| 4,808,887 A | 2/1989 | Fahnrich et al. |
| 5,008,597 A | 4/1991 | Zuchtriegel |
| 5,371,440 A | 12/1994 | Liu et al. |
| 5,521,467 A | 5/1996 | Statnic et al. |
| 5,789,871 A | 8/1998 | Shen et al. |
| 5,914,572 A | 6/1999 | Qian et al. |
| 6,049,472 A * | 4/2000 | Suzuki et al. ............. 363/37 |
| 6,057,652 A | 5/2000 | Chen et al. |
| 6,091,206 A | 7/2000 | Siao |
| 6,107,753 A | 8/2000 | Qian |
| 6,337,800 B1 | 1/2002 | Chang |
| 2002/0011801 A1 | 1/2002 | Chang |

FOREIGN PATENT DOCUMENTS

| | | |
|---|---|---|
| DE | 31 42 613 | 5/1983 |
| JP | 10-214695 | 8/1998 |
| JP | 2000-012257 | 1/2000 |

(Continued)

OTHER PUBLICATIONS

Jinrong Qian, "Charge Pump Power-Factor-Correction Technologies Part I: Concept and Principle", IEEE Transactions on Power Electronics, vol. 15, No. 1, Jan. 2000, pp. 121-129.

(Continued)

*Primary Examiner*—Shawn Riley

(57) ABSTRACT

A circuit (1) used for power factor correction, corresponds to a known circuit that includes a high-frequency frequency source (15) for generating a high-frequency voltage (Uf) for a pump capacitor (14). The high-frequency voltage source (15) has two on/off switches (151, 152) connected in series that generate, at an electric connection point (153), a square wave voltage (U1) that varies between these two switches with a frequency (f) of at least 1 megahertz. The voltage source further includes a smoothing device (150) for generating from the square wave voltage a smoothed voltage (Uf) for the pump capacitor, whereby the smoothed voltage varies with a frequency (f) of at least 1 megahertz.

9 Claims, 1 Drawing Sheet

FOREIGN PATENT DOCUMENTS

| | | |
|---|---|---|
| WO | WO 97/22231 | 6/1997 |
| WO | WO 99/25159 | 5/1999 |

OTHER PUBLICATIONS

Fengfeng Tao et al: "A Comparative Study Of A Family Of Charge Pump Power Factor Correction Electronic Ballasts" Applied Power Electronics Conference and Exposition, 1999 Apec '99 Fourteenth Annual Dallas, TX, USA Mar. 14-18, 1999, Piscataway, NJ, USA, IEEE, US, Mar. 14, 1999, pp. 739-745, XP 010323609.

Calleja A. J. et al., "Design and Experimental Results of an Input-Current-Shaper Based Electronic Ballast", Industry Applications Conference, 1999, Thirty-Fourth IAS Annual Meeting, Conference Record of the 1999 IEEE Phoenix, AZ, USA, Oct. 3-7, 1999, pp. 269-276, XP010355178.

* cited by examiner

POWER FACTOR CORRECTION

TECHNICAL FIELD

The invention relates to a circuit for power factor correction according to the preamble of claim 1 and as is known from Jinrong Quian et al.: "Charge Pump Power-Factor-Correction Technologies Part I: Concept and Principle", IEEE Transactions on Power Electronics, Vol. 15, No. 1, January 2000 (with particular reference to FIG. 6a therein and accompanying description on page 123, right-hand column and subsequent pages).

BACKGROUND OF THE INVENTION

This known circuit and other known circuits for power factor correction (see e.g. the cited document, U.S. Pat. No. 4,808,887, No. 5,008,597, No. 5,371,440, No. 5,521,467, No. 5,789,871, No. 5,914,572, No. 6,057,652, No. 6,091,206, DE-A-3 142 613, WO 97/22231, WO 99/25159, JP-A-10-214 695, JP-A-2000-012 257) are currently used, for example, in modern electronic ballasts, which convert the electrical power from the available mains voltages, usually alternating voltages, in such a way that each of the connected loads, mainly lamps, can be operated in their optimum voltage, current and frequency range. With respect to the mains system, the electronic ballasts are meant to exhibit an electrical response corresponding as closely as possible to a resistance in order to avoid distortions in the mains current and the mains voltage.

The known circuits for power factor correction work at frequencies of 20 to 100 kHz. The frequency is the determining factor for the size of the inductors and capacitors that are required, which are by far the largest components of such circuits.

The invention is based on the problem of providing a circuit for power factor correction that enables miniaturization of this circuit.

SUMMARY OF THE INVENTION

According to this solution, a circuit for power factor correction is provided that comprises:
an input terminal for applying an electrical power having a direct voltage that varies in particular over time with respect to an electrical reference potential,
a reference-potential terminal for applying the reference potential
an output terminal for drawing a power-factor corrected electrical power,
at least two diodes connected in series between the input terminal and output terminal, each connected in the forward direction from the input terminal to the output terminal,
a capacitor connected between the output terminal and the reference-potential terminal,
an extra capacitor having an electrode connected to an electrical junction of the two diodes, and another electrode, and
a frequency voltage source for generating an output voltage which is applied to the other electrode of the extra capacitor, said output voltage varying substantially between the direct voltage at the input terminal and the reference potential at the reference-potential terminal at a frequency that is higher than a frequency of the direct voltage at the input terminal, and which is characterized in that the frequency voltage source comprises:
two on/off switches connected in series between the output terminal and the reference-potential terminal, which switch in push-pull mode at such high speed at a frequency of at least 1 Megahertz that at an electrical junction of these two switches a square-wave voltage is generated that varies substantially between the direct voltage at the input terminal and the reference potential at the reference-potential terminal at this frequency of at least 1 Megahertz, and
a smoothing device for smoothing the square-wave voltage and generating from the square-wave voltage a smoothed voltage which is applied as output voltage of the frequency voltage source to the other electrode of the extra capacitor, said smoothed voltage varying substantially between the direct voltage at the input terminal and the reference potential at the reference-potential terminal at the frequency of at least 1 Megahertz, where
a capacitance of the extra capacitor is selected so that the extra capacitor is charged and/or discharged at the frequency of at least 1 Megahertz of the smoothed voltage.

In the circuit according to the invention, the miniaturization is advantageously achieved by the significant increase in switching frequency from the kHz range to the MHz range. At the same time, the circuit according to the invention advantageously enables switching operation in the MHz range at a high efficiency of 85% to 95%, for example, and with good power factor correction using the on/off switches switching at ultrahigh speed.

In the known circuits for power factor correction operated at 20 to 100 kHz, these moderately high frequencies do mean that a variety of circuits with high efficiency and good power factor correction can be realized, but the size can only be reduced to a limited extent owing to the inductors and capacitors that are required (for a given power).

In a preferred and advantageous embodiment of the circuit according to the invention, the smoothing device comprises a low-pass filter that is substantially completely transparent for the frequency of at least 1 Megahertz, to which the square-wave voltage from the junction of the switches is fed as an input signal, and whose output signal constitutes the smoothed voltage that is applied as output voltage of the frequency voltage source to the other electrode of the extra capacitor.

In a preferred and advantageous form of this embodiment of the circuit according to the invention, the low-pass filter comprises two inductors connected in series between the other electrode of the extra capacitor and the junction of the two switches, and an additional capacitor that is connected between the reference-potential terminal and an electrical junction of the inductors.

In an additional preferred and advantageous embodiment of the circuit according to the invention, the smoothing device comprises an RF transformer having a primary inductor connected between the reference-potential terminal and the junction of the two switches, and having a secondary inductor connected between the other electrode of the extra capacitor and the reference-potential terminal and coupled to the primary inductor. In this embodiment, the RF transformer is preferably operated at resonance with a coupling coefficient k<1.

In a preferred and advantageous form of this further embodiment, an additional capacitor is connected between the primary inductor and the junction of the two switches.

The one and additional embodiment of the circuit according to the invention can be combined with one another in a single circuit, in particular also in the specified forms.

Advantageously, the efficiency of the circuit according to the invention can be further optimized if an additional extra capacitor is connected in parallel with the extra capacitor between the reference-potential terminal and the junction of the two diodes. This additional extra capacitor can be used as a tuning capacitor for optimizing the efficiency.

An on/off switch of the circuit according to the invention preferably comprises a MOS transistor switch, in particular a CoolMOS® switch.

The circuit according to the invention advantageously contains only a few components in all embodiments and their forms, while advantageously achieving a high efficiency of far greater than 90% in the MHz frequency range with very good power factor correction (PFC), provided RF-compatible capacitors, inductors and diodes (Schottky diodes) are used. Its design can be advantageously miniaturized because RF inductors and RF capacitors can be kept very small.

The circuit according to the invention is particularly suitable for electronic ballasts, in particular for any type of lamp.

BRIEF DESCRIPTION OF THE DRAWINGS

The invention is described in more detail below with reference to the figures, in which.

DETAILED DESCRIPTION OF THE DRAWINGS

Figure 1:
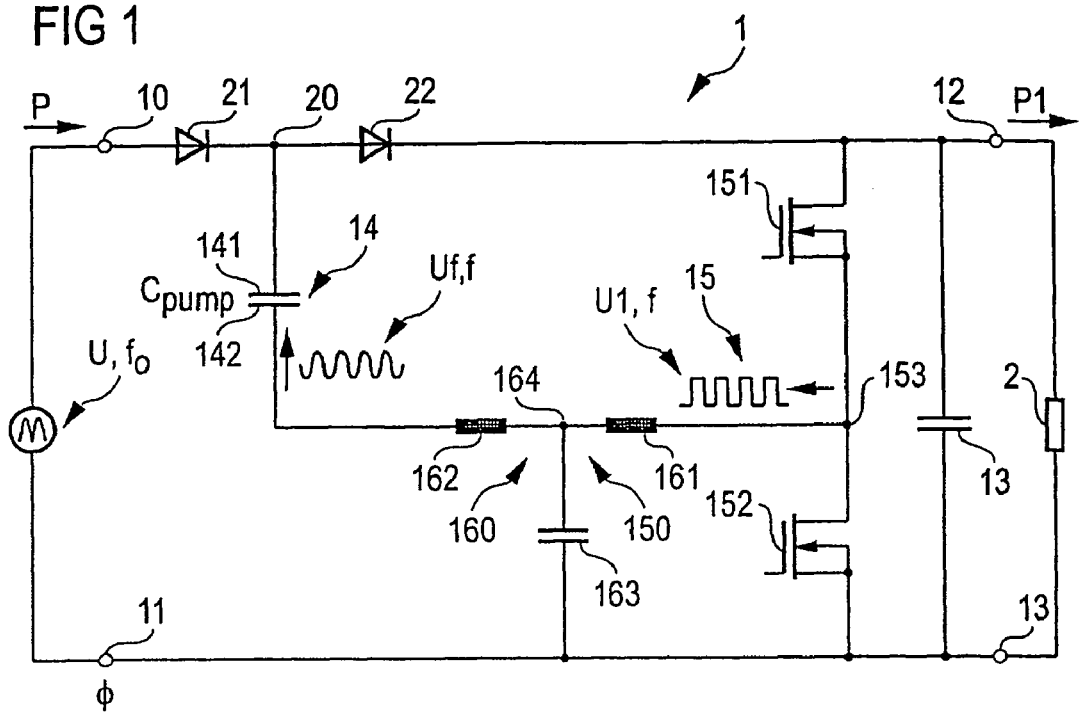
FIG. 1 shows a first exemplary embodiment of the circuit according to the invention.

In the figures, the circuit according to the invention for power factor correction is referred to in general by 1.

An input terminal 10 of the circuit 1 is used for applying an electrical power P having a direct voltage U that varies in particular over time with respect to an electrical reference potential $\phi$ that is to be applied to a reference-potential terminal 11 of the circuit 1, and which is ground for example.

For example, the direct voltage U is a pulsed direct voltage of e.g. 220 V and frequency $f_0=50$ Hz, generated from a mains alternating voltage by rectification in a rectifier that is not shown.

The electrical power P1 that has undergone power factor correction in the circuit 1 is to be drawn from an output terminal 12, for example by a load 2 consisting of one or more lamps for instance, connected between the output terminal 12 and the reference-potential terminal 11. In the figures, this load 2 is connected, for example, between the output terminal 12 and an additional output terminal 13 of the circuit 1 that is connected directly to the reference-potential terminal 11, and like this terminal is at the reference potential $\phi$.

Two diodes 21 and 22 are connected in series between the input terminal 10 and the output terminal 12, each connected in the forward direction from the input terminal 10 to the output terminal 12, so that electrical current I can flow from the input terminal 10 through the diodes 21 and 22 to the output terminal 12 when there is a direct voltage U at the input terminal 10.

A capacitor 13, also called a charging capacitor, is connected between the output terminal 12 and the reference-potential terminal 11, and has a sufficiently high capacitance $C_{lade}$.

An extra capacitor 14 has an electrode 141 connected to an electrical junction 20 of the two diodes 21 and 22, and another electrode 142. This extra capacitor 14, also called a pump capacitor, has a capacitance $C_{pump}$ that is smaller than $C_{lade}$.

A frequency voltage source 15 is used for generating an output voltage which is applied to the other electrode 142 of the extra capacitor 14, said output voltage varying substantially between the direct voltage U at the input terminal 10 and the reference potential $\phi$ at the reference-potential terminal 11 at a frequency that is higher than a frequency, e.g. the frequency $f_0$, of the direct voltage U at the input terminal 10.

Up to this point, the circuit 1 according to the invention corresponds to the circuit that follows from the first document cited above.

In the circuit 1 according to the invention, the frequency voltage source 15 comprises two on/off switches 151 and 152 connected in series between the output terminal 12 and the reference-potential terminal 11, which switch in push-pull mode at such high speed at a frequency f of at least 1 Megahertz that between these two switches 151 and 152 a square-wave voltage U1 is generated that varies substantially between the direct voltage U at the input terminal 10 and the reference potential $\phi$ at the reference-potential terminal 11 at this frequency f of at least 1 Megahertz.

If the lower switch 152 is on while the upper switch 151 is off, at this moment in time the junction 153 is at the voltage equal to the voltage present at the output of the diode 22, and hence present at the output terminal 12 of the circuit 1, said voltage being substantially equal to the direct voltage U at the input terminal 10 of the circuit 1. If on the other hand the lower switch 152 is off while the upper switch 151 is on, at this moment in time the junction 153 is at a voltage substantially equal to the reference potential $\phi$.

In addition, in the circuit 1 according to the invention, the frequency voltage source 15 comprises a smoothing device 150 for smoothing the square-wave voltage U1 and for generating from the square-wave voltage U1 a smoothed voltage Uf which is applied as output voltage of the frequency voltage source 15 to the other electrode 142 of the extra capacitor 14, said smoothed voltage varying substantially between the direct voltage U at the input terminal 10 and the reference potential $\phi$ at the reference-potential terminal 11 at the frequency f of at least 1 Megahertz.

The smoothing device 150 is preferably designed so that a substantially sinusoidal smoothed voltage Uf of the frequency f is generated from the square-wave voltage U1 of the frequency.

The capacitance $C_{pump}$ of the extra capacitor 14 is selected in the circuit 1 so that the extra capacitor 14 is charged and/or discharged at the frequency f of at least 1 Megahertz of the smoothed voltage Uf.

In the exemplary embodiment shown in FIG. 1 of the circuit 1, the smoothing device 150 comprises a low-pass filter 160 that is substantially completely transparent for the frequency f of at least 1 Megahertz. The square-wave voltage U1 from the junction 153 of the switches 151 and 152 is fed as an input signal to the low-pass filter 160, and the output signal of the low-pass filter 160 constitutes the smoothed voltage Uf that is applied as the output voltage of the frequency voltage source 15 to the other electrode 142 of the extra capacitor 14.

The low-pass filter 160 especially comprises two inductors 161 and 162 connected in series between the other electrode 142 of the extra capacitor 14 and the junction 153 of the two switches 151 and 152, and an additional capacitor 163. This capacitor 163 is connected between the reference-potential terminal 11 and an electrical junction 164 of the inductors 161 and 162.

Figure 2:
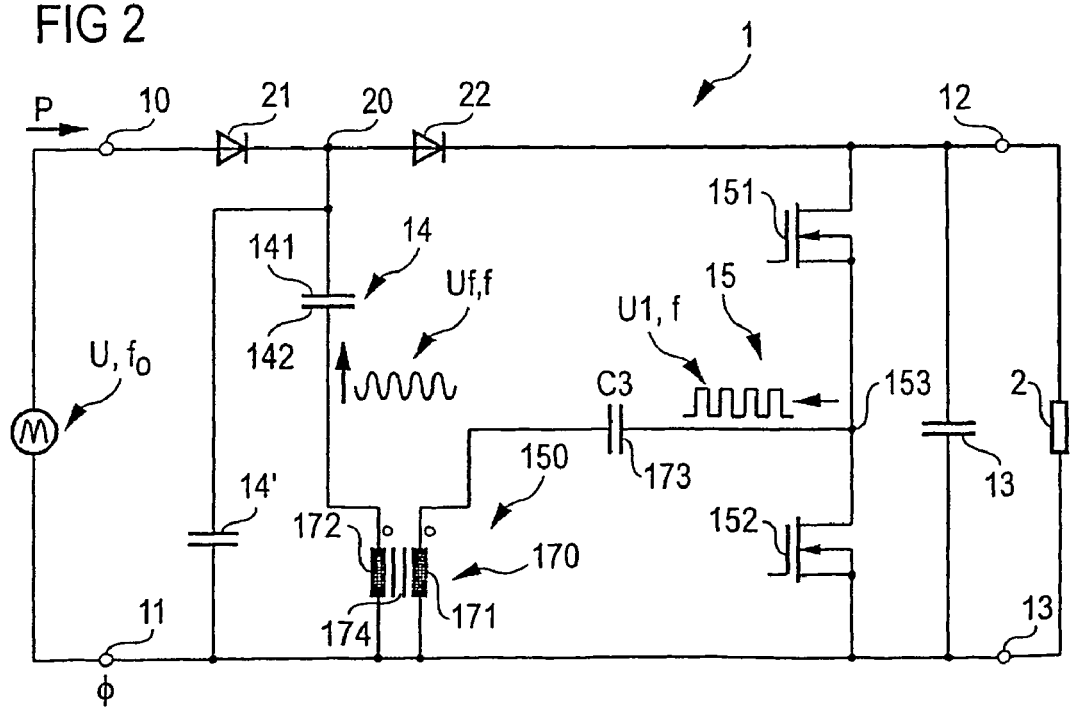
FIG. 2 shows a second exemplary embodiment of the circuit according to the invention.

In the exemplary embodiment shown in FIG. 2, the smoothing device 150 comprises an RF transformer 170 having a primary inductor 171 connected between the reference-potential terminal 11 and the junction 153 of the two switches 151 and 152, and having a secondary inductor 172 connected between the other electrode 142 of the extra capacitor 14 and the reference-potential terminal 11 that is coupled to the primary inductor 171, for example via an iron core 174.

An additional capacitor 173 is especially connected between the primary inductor 171 and the junction 153 of the two switches 151 and 152, said additional capacitor providing DC isolation between the junction 153 and the transformer 170 and providing only AC coupling to the transformer 170. The transformer 170 is operated at resonance with a coupling coefficient k<1.

In the circuit 1 shown in FIGS. 1 and 2, an additional extra capacitor can be connected in parallel with the extra capacitor 14 between the reference-potential terminal 11 and the junction 20 of the two diodes 21 and 22, as is shown in the exemplary embodiment of FIG. 2 with the reference 14'.

The efficiency of the circuit 1 can be further optimized using such an additional extra capacitor 14'.

Each of the on/off switches 151 and 152 is implemented by a MOS transistor switch, preferably a CoolMOS® switch.

To summarize, the circuit 1 for power factor correction corresponds to a known circuit of this type having an RF voltage source 15 for generating a radio-frequency voltage Uf for a pump capacitor 14. The RF voltage source 15 comprises according to the invention two series-connected on/off switches 151 and 152, which generate at an electrical junction 153 of these two switches 151 and 152 a square-wave voltage U1 that varies at a frequency f of at least 1 Megahertz, and a smoothing device 150 for generating from the square-wave voltage U1 a smoothed voltage Uf for the pump capacitor 14, said smoothed voltage varying at the frequency f of at least 1 Megahertz.

The invention claimed is:

1. A circuit (1) for power factor correction comprising:
    an input terminal (10) for applying an electrical power (P) having a direct voltage (U) that varies in particular over time with respect to an electrical reference potential (φ),
    a reference-potential terminal (11) for applying the reference potential (φ)
    an output terminal (12) for drawing a power-factor corrected electrical power (P1),
    at least two diodes (21, 22) connected in series between the input terminal (10) and output terminal (12), each connected in the forward direction from the input terminal (10) to the output terminal (12),
    a capacitor (13) connected between the output terminal (12) and the reference-potential terminal (11), and
    an extra capacitor (14) having an electrode (141) connected to an electrical junction (20) of the two diodes (21, 22), and another electrode (142), and
    a frequency voltage source (15) for generating an output voltage which is applied to the other electrode (142) of the extra capacitor (14), said output voltage varying substantially between the direct voltage (U) at the input terminal (10) and the reference potential (φ) at the reference-potential terminal (11) at a frequency that is higher than a frequency ($f_0$) of the direct voltage (U) at the input terminal (10), characterized in that the frequency voltage source (15) comprises:
    two on/off switches (151, 152) connected in series between the output terminal (12) and the reference-potential terminal (11), which switch in push-pull mode at such high speed at a frequency (f) of at least 1 Megahertz that at an electrical junction of these two switches (151, 152) a square-wave voltage (U1) is generated that varies substantially between the direct voltage (U) at the input terminal (10) and the reference potential (φ) at the reference-potential terminal (11) at this frequency (f) of at least 1 Megahertz, and
    a smoothing device (150) for smoothing the square-wave voltage (U1) and generating from the square-wave voltage (U1) a smoothed voltage (Uf) which is applied as output voltage of the frequency voltage source (15) to the other electrode (142) of the extra capacitor (14), said smoothed voltage varying substantially between the direct voltage (U) at the input terminal (10) and the reference potential (φ) at the reference-potential terminal (11) at the frequency (f) of at least 1 Megahertz, where
    a capacitance ($c_{pump}$) of the extra capacitor (14) is selected so that the extra capacitor (14) is charged and/or discharged at the frequency (f) of at least 1 Megahertz of the smoothed voltage (Uf).

2. The circuit as claimed in claim 1, wherein the smoothing device (150) comprises a low-pass filter (160) that is substantially completely transparent for the frequency (f) of at least 1 Megahertz, to which the square-wave voltage (U1) from the junction (153) of the switches (151, 152) is fed as an input signal, and whose output signal constitutes the smoothed voltage (Uf) that is applied as output voltage of the frequency voltage source (15) to the other electrode (142) of the extra capacitor (14).

3. The circuit as claimed in claim 2, wherein the low-pass filter (160) comprises two inductors (161, 162) connected in series between the other electrode (142) of the extra capacitor (14) and the junction (153) of the two switches (151, 152), and an additional capacitor (163) that is connected between the reference-potential terminal (11) and an electrical junction (164) of the inductors (161, 162).

4. The circuit as claimed in claim 2, wherein the smoothing device (150) comprises an RF transformer (170) having a primary inductor (171) connected between the reference-potential terminal (11) and the junction (153) of the two switches (151, 152), and having a secondary inductor (172) connected between the other electrode (142) of the extra capacitor (14) and the reference-potential terminal (11) and coupled to the primary inductor (171).

5. The circuit as claimed in claim 4, wherein an additional capacitor (173) is connected between the primary inductor (171) and the junction (153) of the two switches (151, 152).

6. The circuit as claimed in claim 1, wherein an additional extra capacitor (14') is connected in parallel with the extra capacitor (14) between the reference-potential terminal (11) and the junction (20) of the two diodes (21, 22).

7. The circuit as claimed in claim 1, wherein an on/off switch (151, 152) comprises a MOS transistor switch.

8. The circuit as claimed in claim 2 or 3, wherein the smoothing device (150) comprises an RF transformer (170) having a primary inductor (171) connected between the reference-potential terminal (11) and the junction (153) of the two switches (151, 152), and having a secondary inductor (172) connected between the other electrode (142) of the extra capacitor (14) and the reference-potential terminal (11) and coupled to the primary inductor (171).

9. The circuit as claimed in claim 4, wherein an additional capacitor (173) is connected between the primary inductor (171) and the junction (153) of the two switches (151, 152).

* * * * *